Patented Sept. 25, 1945

2,385,475

UNITED STATES PATENT OFFICE 2,385,475

PROCESS FOR PRODUCTION OF CHLORINATED ALIPHATIC HYDROCARBONS

James S. Sconce, John T. Rucker, Stuart E. Whitmire, and William R. Schoonover, Niagara Falls, N. Y., assignors to Hooker Electrochemical Company, Niagara Falls, N. Y., a corporation of New York No Drawing. Application September 2, 1943, Serial No. 501,006

5 Claims. (Cl. 260—652.5)

Our invention relates more particularly to highly chlorinated aliphatic hydrocarbons. One object of our invention is to improve the whiteness and odor of such materials. Another object of our invention is to increase the friability of highly chlorinated aliphatic hydrocarbons, and in particular hexachlorethane, tending in solidifying pass through a tough waxy state.

In the chlorination of hydrorarbons, both saturated and unsaturated, which frequently contain various impurities, including oxidation products of hydrocarbons, such other hydrocarbons or impurities are liable to become chlorinated at the same time, and their chlorination products are generally unstable, irritant, corrosive, odoriferous and generally of an objectionable nature. The products also contain dissolved chlorine and hydrogen chloride. It is common practice to treat such chlorinated hydrocarbons by first blowing with air, which removes all but traces of the dissolved gases, and then neutralizing by means of caustic soda, sodium carbonate or ammonia. The air blowing oxidizes some of the impurities to forms, such as ketones, organic acids and esters, in which their odor is aggravated. These may be modified by contact with the alkalies. However, many of the chlorinated hydrocarbons are quite viscous; hence there is considerable difficulty in effectively contacting them with solid alkaline agents. For this reason, in treating normally liquid chlorinated hydrocarbons anhydrous ammonia is sometimes preferred, as it can be bubbled through the liquid. However, contact between gases and viscous liquids is not very intimate and if the liquid is a normally solid material the process is complicated by a tendency to spatter and form encrustations, and this is particularly true if the liquid is viscous and the material has a high melting point.

For purpose of illustration we will take hexachlorethane. Hexachlorethane melts at about 185° C., and to contact it effectively with alkaline agents, solid or gaseous, is not a simple matter.

We have found that molten hexachlorethane if cooled from its triple point at 186.8° C. solidifies to a cubic crystal of waxy texture, which forms a tough solid mass, difficult to detach from the cooling surfaces and to break up. As this mass cools the character of its crystalline structure changes. At about 70° C. the crystals have become triclinic and at about 35° C. rhombic. In the latter forms the mass is quite friable, readily breaking up into a freely flowing granular material.

By melting the hexachlorethane and atomizing it into an atmosphere of ammonia we have found it possible to contact the ammonia with the material so thoroughly that the desired neutralization effect is obtained; but if the molten hexachlorethane is sprayed into a chamber having cooled walls it is liable to solidify into a solid cake of the tough waxy consistency above described wherever it impinges on the cooling surfaces. This cake is difficult to remove and moreover tends to obstruct the inlet. We have found it possible to overcome this difficulty, however, by introducing cold dry air with the spray and regulating the temperature and volume of the air so that the hexachlorethane is cooled below the temperature at which it forms the waxy mass before it comes into contact with the walls of the chamber. Mixing the ammonia with the air then becomes a convenient way of introducing it. The mixture of air and ammonia may be blown into the chamber in the form of an annular jet, and the molten hexachlorethane may be sprayed into the chamber at the center of the jet; or the air and ammonia may be used to aid in atomizing the liquid. In this way the hexachlorethane is intimately contacted with the ammonia and cooled rapidly to not above 70° C. and preferably to 50° C., at which temperature it becomes friable and easily removable from the chamber. As hexachlorethane at atmospheric pressure passes directly from solid to gas phase, it is melted under a pressure of 10 to 35 lbs. gauge and sprayed into the cooling chamber at 186° to 220° C. The chamber may be a water-jacketed inclined rotary cooler, typically fifty-four inches in diameter by forty feet long, the molten material entering at the high end and the granular product leaving at the low end. The vapor pressure of hexachlorethane being quite high, if the air used for the cooling jet were vented to the atmosphere, an excessive loss of product would result. We therefore prefer to cool and recycle the air. For best results, the ammonia should be regulated so that there will be a slight excess in the exit from the chamber. The effect of the ammonia on the dew point of the air is negligible.

When air alone is used to cool and atomize the hexachlorethane it leaves the cooling chamber with a color ranging from cream to yellow and an odor ranging from acrid to intolerably irritating, depending upon the humidity of the air and final temperature of the product. We have found that as little as 0.1 per cent of hydrogen chloride in air raises its dew point 10° to 11° C. If the hydrogen chloride is not neutralized it is condensed in the product, rendering it corrosive to metals and causing it to attack and weaken the paper bags in which it is shipped. When ammonia is mixed with the air however, the product leaves the cooling chamber in a non-corrosive condition and with a milk white color and only a mild and not unpleasant odor.

We claim as our invention:

1. The process for production of granular hexachlorethane which comprises melting the material under a pressure of not less than 10 lbs. per sq. in. gauge, spraying it in liquid phase at that pressure into a cooling chamber in contact with a blast of cold dry air, and regulating the temperature and volume of the air to cool the material to a temperature of not over 70° C. before allowing it to come into contact with the walls of the chamber.

2. The process for production of granular hexachlorethane which comprises melting the material under a pressure of 10 to 35 lbs. per sq. in. gauge, spraying it in liquid phase at that pressure into a cooling chamber in contact with a blast of cold dry air, and regulating the temperature and volume of the air to cool the material to a temperature of not over 70° C. before allowing it to come into contact with the walls of the chamber.

3. The process for production of granular hexachlorethane which comprises melting the material under a pressure of not less than 10 lbs. per sq. in. gauge, spraying it at that pressure and 186° to 200° C. into a cooling chamber in contact with a blast of cold dry air, and regulating the temperature and volume of the air to cool the material to a temperature of not over 70° C. before allowing it to come into contact with the walls of the chamber.

4. The process for production of granular hexachlorethane which comprises melting the material under a pressure of not less than 10 lbs. per sq. in. gauge, spraying it in liquid phase at that pressure into a cooling chamber in contact with a blast of cold dry air, and regulating the temperature and volume of the air to cool the material to a temperature of substantially 50° C. before allowing it to come into contact with the walls of the chamber.

5. The process for production of granular hexachlorethane of relatively mild odor and high whiteness from the impure chlorination product which comprises melting the material under a pressure of not less than 10 lbs. per sq. in. gauge, spraying it in liquid phase at that pressure in contact with a blast of cold dry air and gaseous ammonia, into a cooling chamber, and regulating the temperature and volume of the gases to cool the material to a temperature of not over 70° C. before allowing it to come into contact with a wall of the chamber.

JAMES S. SCONCE.
JOHN T. RUCKER.
STUART E. WHITMIRE.
WILLIAM R. SCHOONOVER.